United States Patent [19]

Lee

[11] 4,313,146

[45] Jan. 26, 1982

[54] HIGH IMPEDANCE FAULT DETECTION ON POWER DISTRIBUTION CIRCUITS

[75] Inventor: Ilyoul Lee, Pacific Palisades, Calif.

[73] Assignee: Electric Power Research Institute, Inc., Palo Alto, Calif.

[21] Appl. No.: 89,203

[22] Filed: Oct. 29, 1979

[51] Int. Cl.³ .............................................. H02H 3/26
[52] U.S. Cl. ....................................... 361/85; 361/42; 361/86; 361/113; 324/107
[58] Field of Search ....................... 361/85, 84, 86, 87, 361/113, 42, 47, 48; 324/107, 83 R, 83 A, 78 F

[56] References Cited

U.S. PATENT DOCUMENTS

| | | |
|---|---|---|
| 3,308,345 | 3/1967 | Warrington ...................... 361/86 X |
| 3,515,943 | 9/1967 | Warrington ....................... 361/113 |
| 4,025,848 | 5/1977 | Delagrange et al. ......... 324/83 A X |
| 4,196,463 | 4/1980 | Dickerson ........................ 361/113 |

Primary Examiner—Patrick R. Salce
Attorney, Agent, or Firm—Flehr, Hohbach, Test

[57] ABSTRACT

A technique for detecting high impedance faults on solidly grounded, wye connected distribution circuits is disclosed herein. This technique bases its detection on the status of the third harmonic current component in each three-phase line current of the distribution circuit and specifically by the change in the phase of any one of the components during a period when the phases of the other third harmonic components remain unchanged. AT the same time, the technique disclosed herein discriminates between high impedance faults and many of the normal system disturbances such as capacitor switching, line switching, fuse blowing and others.

13 Claims, 13 Drawing Figures

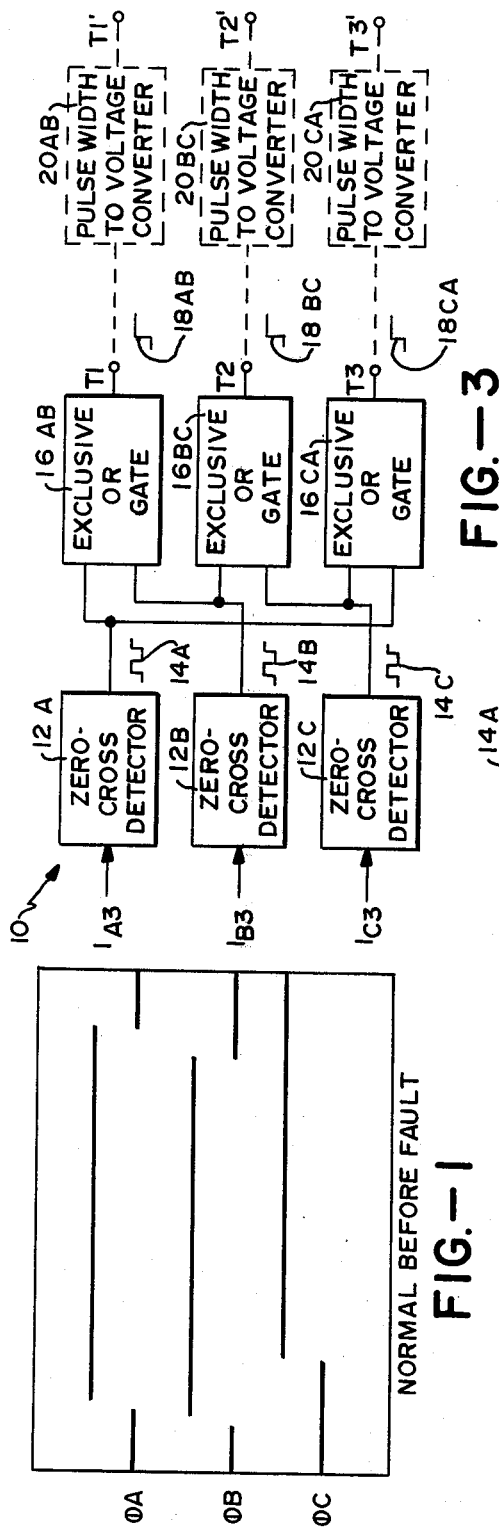
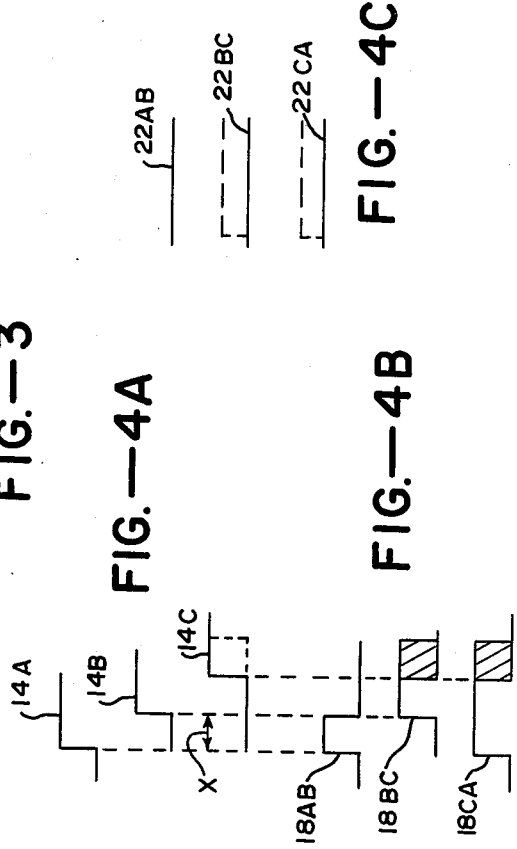
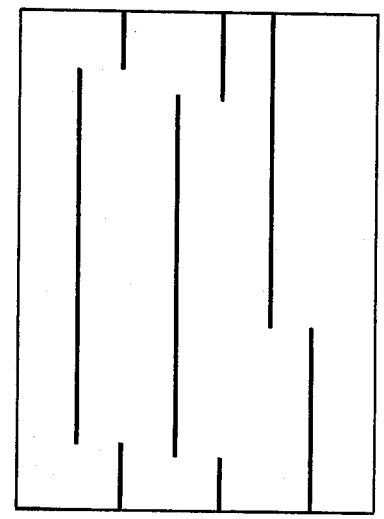
FIG.—1 NORMAL BEFORE FAULT
FIG.—2 AFTER FAULT
FIG.—3
FIG.—4A
FIG.—4B
FIG.—4C

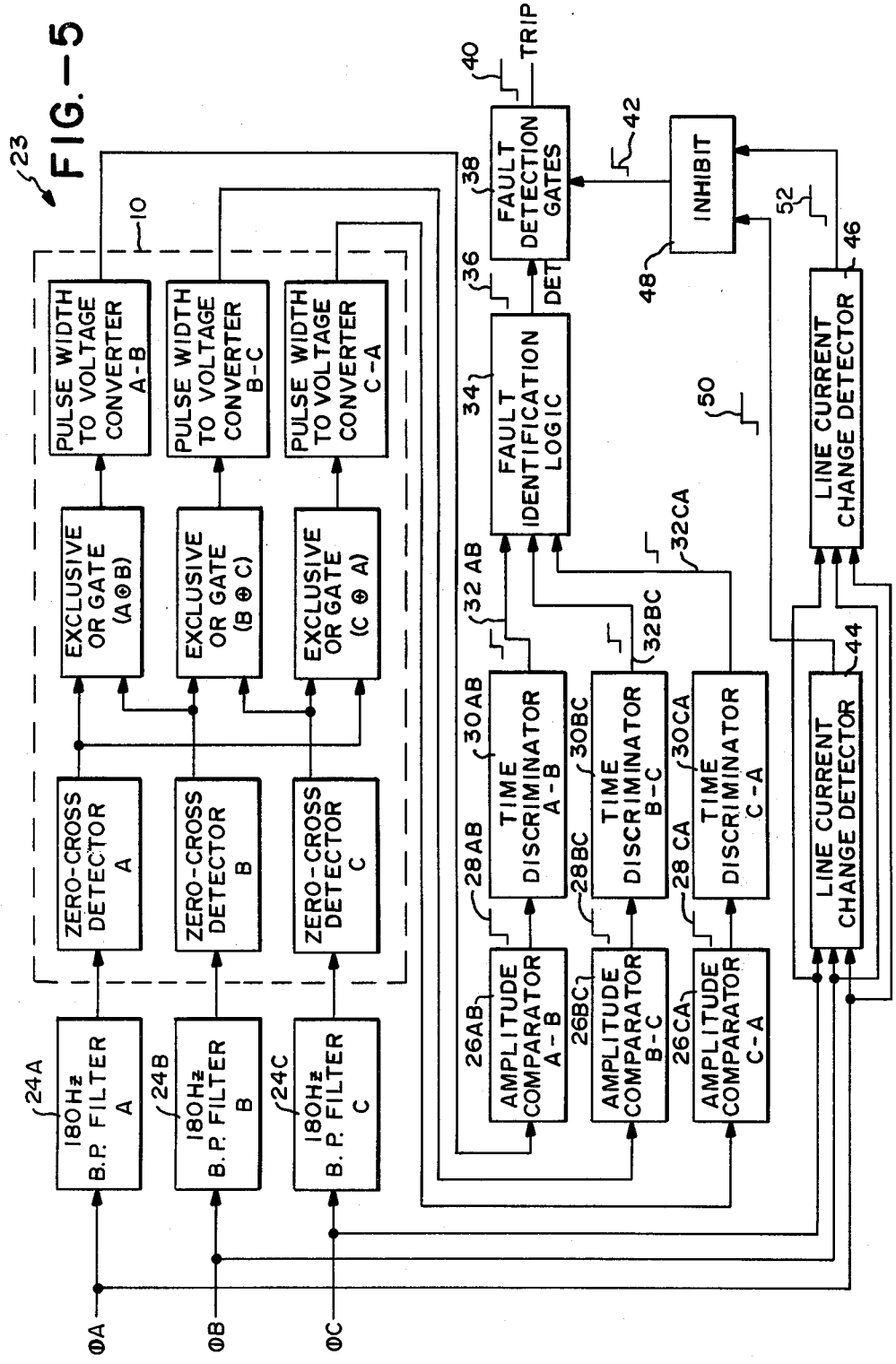

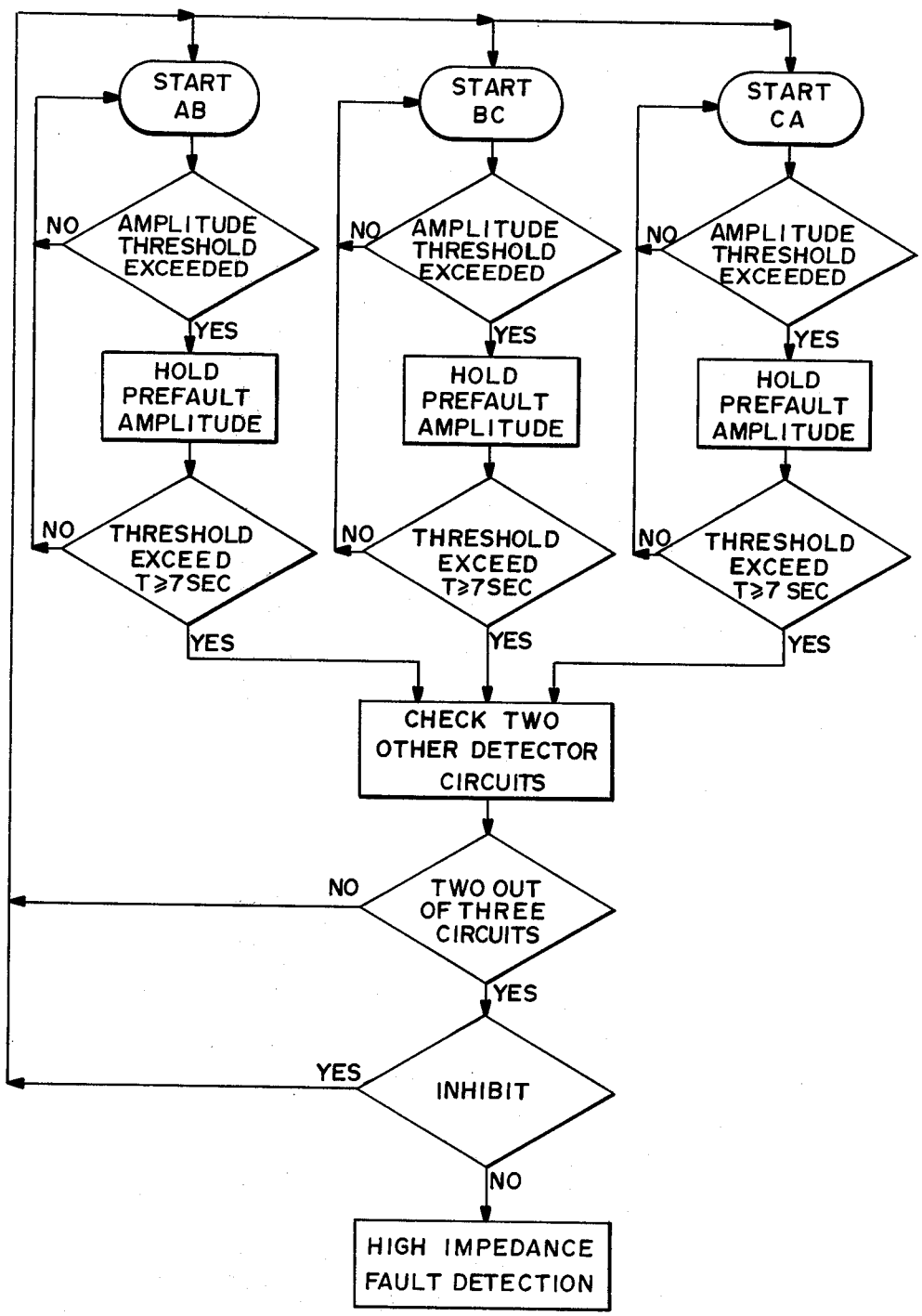
FIG. — 6

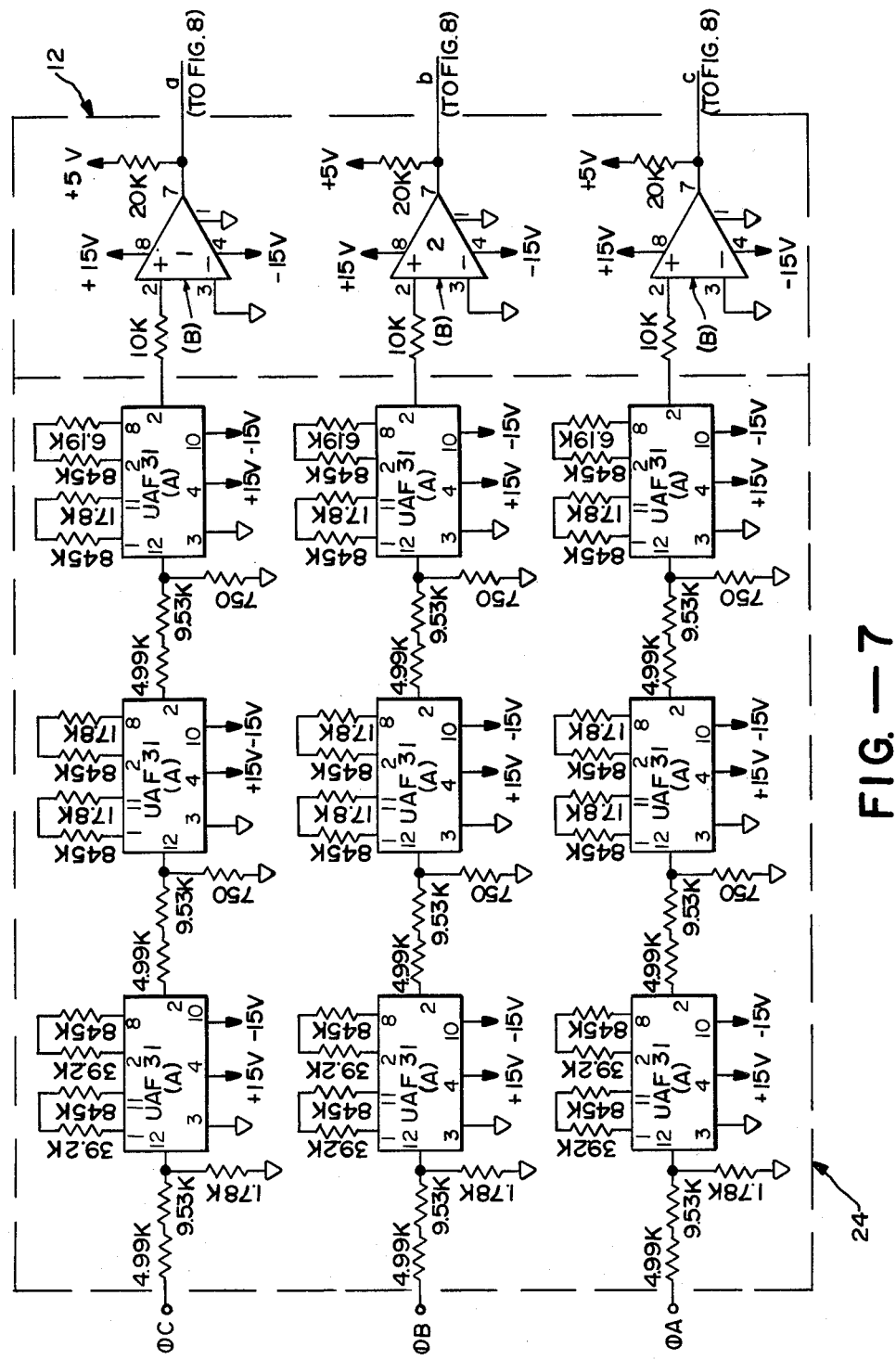
FIG.—7

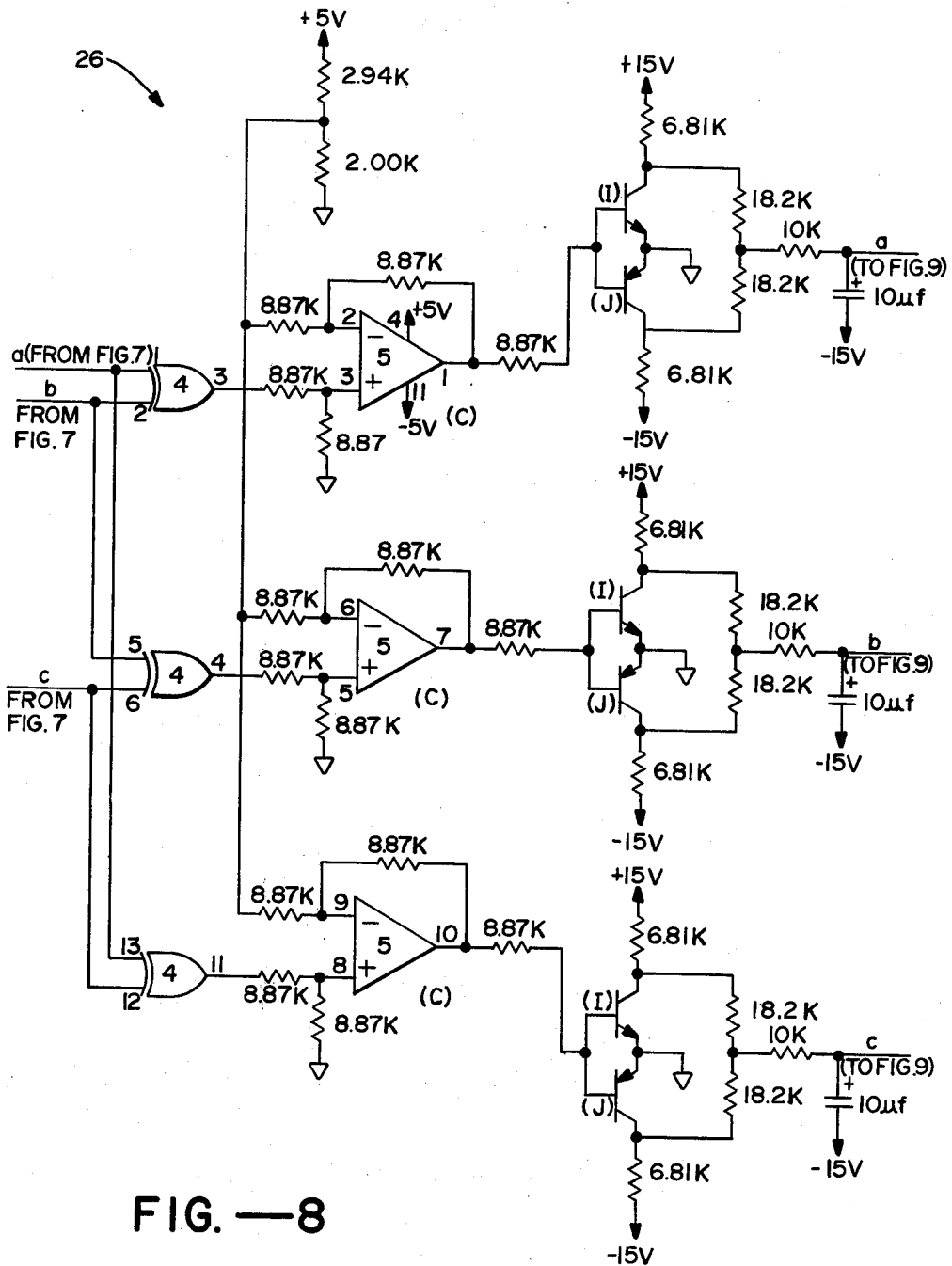
FIG.—8

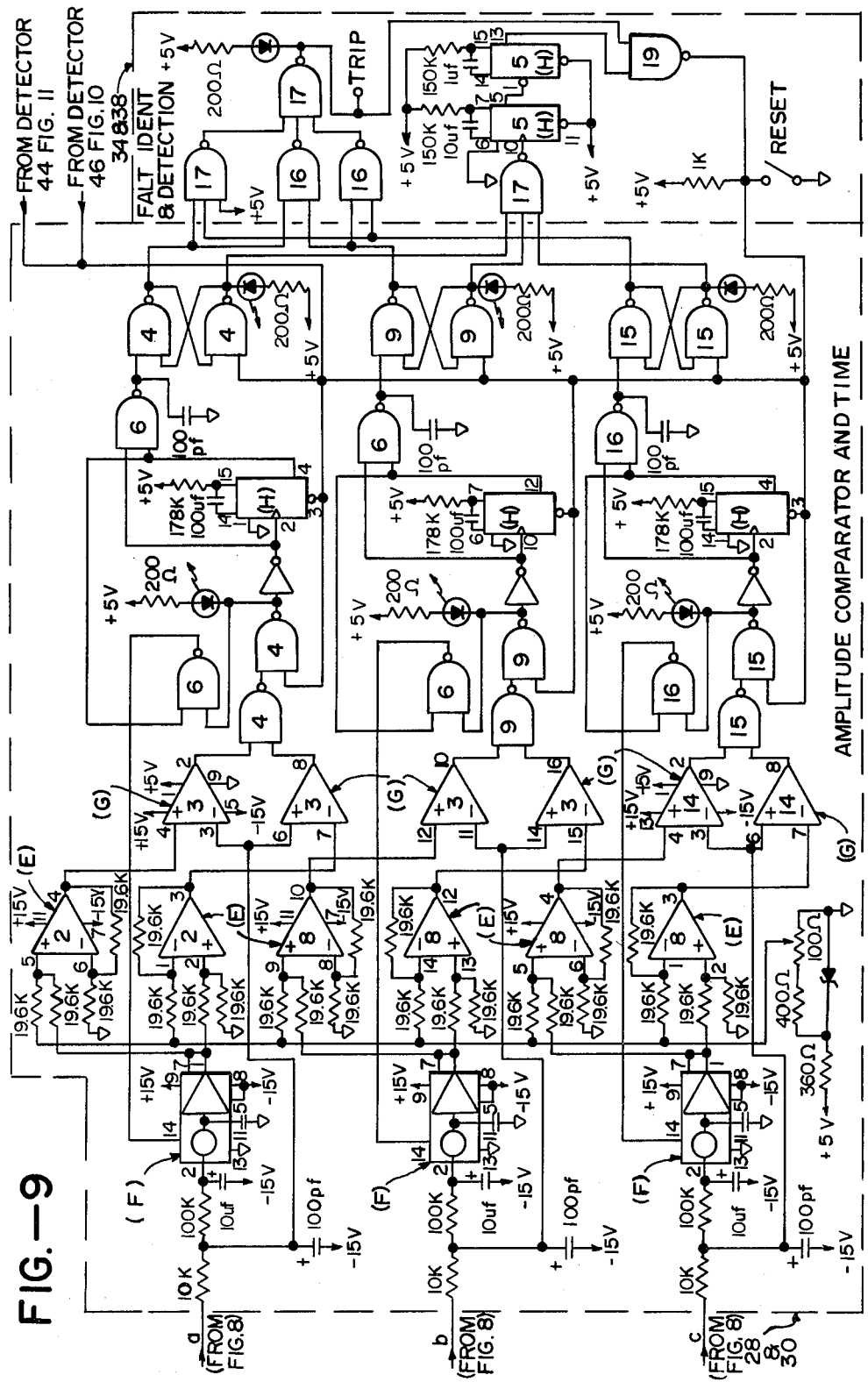
FIG.—9

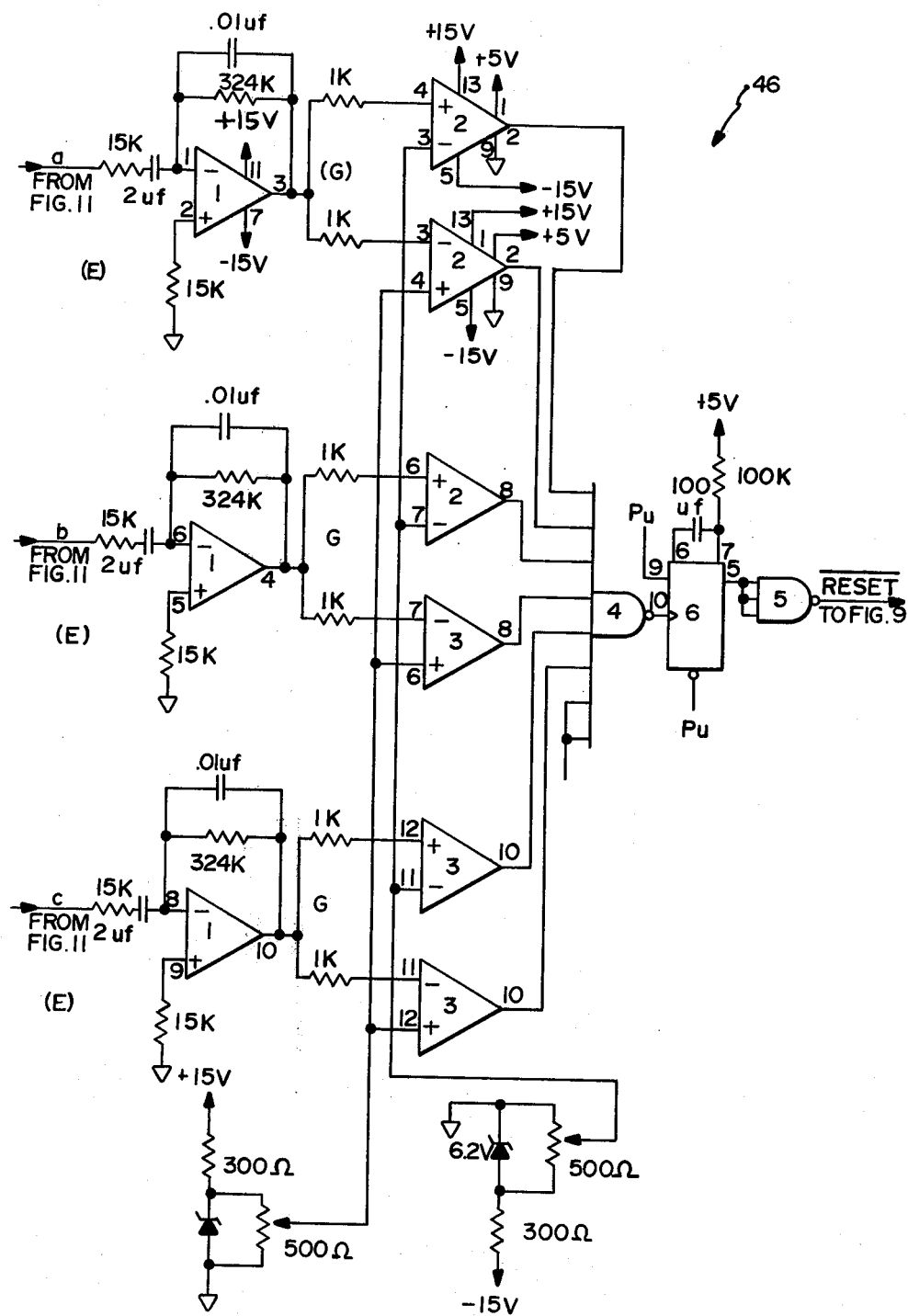
FIG.—10

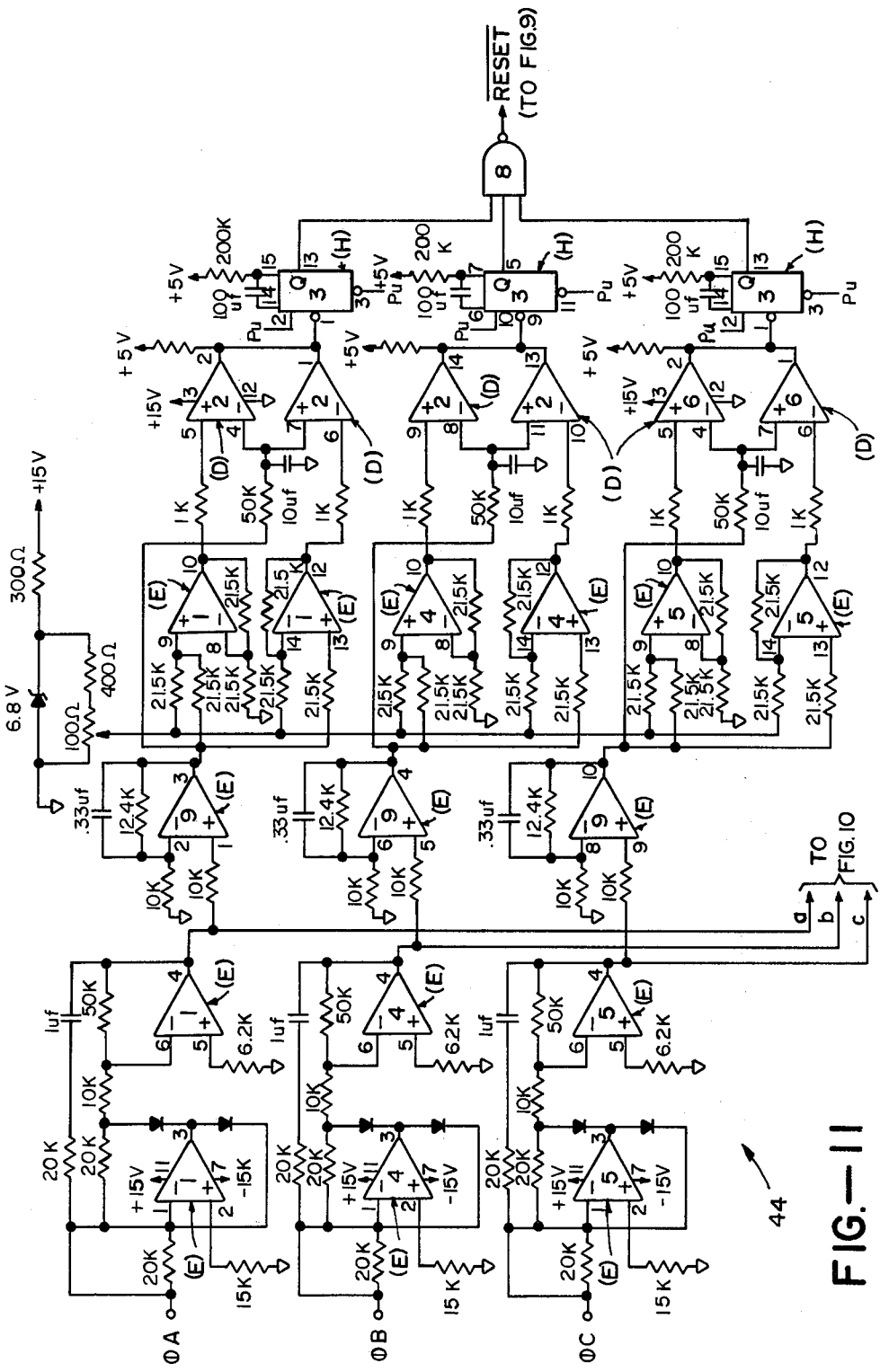
FIG.—11

HIGH IMPEDANCE FAULT DETECTION ON POWER DISTRIBUTION CIRCUITS

The present invention relates generally to a technique for detecting high impedance faults in electrical distribution circuits and more particularly to a technique for detecting such faults on solidly grounded, wye connected distribution circuits by monitoring the phase relationship among the third harmonic current components in the three-phase line currents in the distribution circuit, specifically by monitoring for a change in phase of any one of the components during a period when the others remain unchanged. The present invention is also directed to a particular device which carries out this phase monitoring technique.

A high impedance fault is defined herein to include a broken phase conductor which may or may not contact ground or an intact phase conductor contacted by a high impedance path to ground. The clearing of distribution line faults generally has heretofore been accomplished by a device which senses the overcurrent produced by the fault. However, a high impedance to ground path can limit the fault current to values which are below the threshold of operation of such a device and thus the fault condition presists. One suggested way of detecting high impedance faults other than by sensing overcurrent directly is disclosed in U.S. Pat. No. 3,308,345. There, a technique is provided for monitoring the amplitude of a combination of high harmonic components of the phase currents. Applicant has not found this to be satisfactory, although the utilization of the amplitude of third harmonic current components specifically is the subject of his copending application Ser. No. 089,202 filed Oct. 29, 1979. There, a technique is disclosed for detecting high impedance faults on, three-phase distribution circuits with delta connected loads. However, applicant found that in wye connected circuits which were otherwide similar, it was very difficult to discriminate between a high impedance fault and many normal system disturbances, e.g. capacitor switching, line switching and the like, by amplitude change alone. In this regard, as will be discussed hereinafter, applicant did discover the change in relative phase relationship between the third harmonic components of the three-phase line currents in the circuit during such a fault. This, in turn, leads to an uncomplicated and reliable technique for accurately sensing for the presence of a high impedance fault in a wye connected circuit while, at the same time, discriminating between the fault and normal system disturbances.

In view of the foregoing, one object of the present invention is to provide an uncomplicated and yet reliable technique for monitoring for high impedance faults on solidly grounded, wye connected distribution circuits while, at the same time, discriminating between such faults and some of the normal system disturbances.

Another object of the present invention is to implement the foregoing technique by monitoring the phase relationship between the third harmonic current components in the three phase line currents of the distribution circuit while, at the same time, monitoring certain amplitude aspects of the line currents to provide in part the recited discrimination.

Still another object of the present invention is to provide a device for monitoring phase current in three phase distribution circuits, and specifically a device which senses a change in phase in any one of the currents during a period when the others remain unchanged.

Yet another object of the present invention is to utilize a device of the type just recited in the previously mentioned technique for detecting high impedance faults.

As will be described in more detail hereinafter, the overall technique disclosed herein is one which detects high impedance faults in solidly grounded, wye connected three-phase distribution circuits by first sensing the phases of the third harmonic components in each of the three phase currents of the distribution circuit and by providing a preliminary detection signal resulting from a change in the phase of any one of the current components for a predetermined period of time, at which time the phase of the other components remain unchanged. At the same time, certain aspects relating to the magnitude of the three-phase line currents are monitored for producing an inhibit signal in response to and indicative of specific changes there. A fault indicating signal is produced in response to the presence of a preliminary detection signal but only in the absence of an inhibit signal at the same time. By requiring a single phase change for a period of time and by monitoring line current amplitude, the overall technique discriminates between a real high impedance fault and other disturbances which may be present in the distribution circuit and which may otherwide present themselves as faults.

The technique just described briefly is one which utilizes a specific device for detecting a change in phase in any one of the third harmonic components recited above while the other remain unchanged. In order to accomplish this, the device includes means for producing three square wave current signals, each corresponding in phase to one of the third harmonic current components and three EXCLUSIVE OR gates. The first one of these gates includes a pair of inputs respectively responsive to first and second ones of the square wave current signals for producing a first output signal corresponding in duration to the difference in phase between these latter signals and, hence, the corresponding first and second third harmonic current components. A second gate includes a pair of inputs respectively responsive to the second and a third one of the square wave signals for producing a second output signal corresponding in duration to the difference in the phase between these latter signals and therefore the corresponding second and third current components. Finally, the third gate has a pair of inputs respectively responsive to the first and third square wave current signals for producing a third output signal corresponding in duration to the difference in the phase between the first and third current signals and therefore the first and third current components. With this type of arrangement, it is easy to sense a change in the phase of any one of the current components during a period when the others remain unchanged (as required in the overall fault detecting system) by sensing for a change in two of the three output signals while one remains unchanged.

A more detailed description of the overall fault detecting technique disclosed herein and the phase sensing device just described generally will be provided hereinafter in conjunction with the drawings wherein:

FIG. 1 is a diagrammatic illustration corresponding to an actual taped (visual) recording of the way in which the phases of the third harmonic components in the line currents of a solidly grounded, wye connected three-phase distribution circuit appear during normal (non-fault) operation of the circuit;

FIG. 2 is a diagrammatic illustration similar to FIG. 1 but showing the phase relationship between the current components after a fault, specifically after a line open-source ground fault;

FIG. 3 is a block diagram of a phase change detector designed in accordance with the present invention;

FIGS. 4A, 4B and 4C illustrate certain signals associated with the device of FIG. 3;

FIG. 5 is a block diagram of an overall system for detecting high impedance faults on solidly grounded, wye connected distribution circuits in accordance with the present invention and utilizing a device of the type illustrated in FIG. 3;

FIG. 6 is a flow diagram of the overall system illustrated in the block diagram of FIG. 5;

FIG. 7 is a schematic illustration of a filter arrangement and zero-cross detectors comprising part of the system of FIG. 5;

FIG. 8 is a schematic illustration of a group of EXCLUSIVE OR gates interconnected as part of a phase-change detector and a group of PULSE WIDTH TO VOLTAGE converters all of which comprise part of the overall system of FIG. 5;

FIG. 9 is a schematic illustration of a group of amplitude comparators and time discriminators along with a fault identification logic circuit and fault detection circuit comprising part of the overall system of FIG. 5;

FIG. 10 is a schematic illustration of the circuitry comprising a LINE CURRENT CHANGE detector comprising part of the system of FIG. 5; and FIG. 11 is a schematic illustration of the circuitry comprising a second LINE CURRENT CHANGE detector comprising part of the system of FIG. 5.

Turning now to the drawings wherein like components are designated by like reference numerals throughout the various figures, attention is first directed to FIGS. 1 and 2 which show the phase relationship between the third harmonic current components in the line currents of a solidly grounded, wye connected three-phase distribution circuit. FIG. 1 illustrates the phase relationship before a high impedance fault, that is, during normal circuit operation (without the presence of other possible disturbances) and FIG. 2 illustrates the phase relationship after (during) a high impedance fault, specifically after one conductor (e.g. the "C" phase line) breaks and is grounded on the source side. In these figures, it can be seen that the third harmonic component in each of the A and B phase conductor currents remains unchanged before and after the fault. On the other hand, it should be equally apparent that there is a delay in the phase of the third harmonic current component in the C-phase line current. A careful examination of the phase change reveals that phase C in FIG. 2 lags of 19° with respect to phase C of FIG. 1. In other words, during the high impedance fault of phase line C, there is a change in the phase of the third harmonic component in that line during a period when the phases of the other components remain unchanged. It has been found that this is equally true for all high impedance faults on a given line in the solidly grounded, wye connected three-phase distribution circuit.

Referring now to FIG. 3, attention is directed to a phase change detection device 10 designed in accordance with the present invention and provided for detecting the phase relationship just described. As shown in FIG. 3, device 10 includes three zero-cross detectors 12A, 12B and 12C, each of which is adapted for connection to one of the line currents in the three-phase distribution circuit for receiving the current or, in the case of the present invention, for receiving its third harmonic component (by providing appropriate filtering means). Each zero-cross detector includes circuitry readily provided by those with ordinary skill in the art for converting the incoming current or component such as the sinusoidal third harmonic component to a square wave, preferably one oscillating between 0 volts and a positive value. These square wave signals are indicated at 14A, 14B and 14C in FIGS. 3 and 4A.

Device 10 also includes three EXCLUSIVE OR gates 16AB, 16BC and 16CA, also of conventional or readily provided design. As seen in FIG. 3, gate 16AB has two inputs A and B connected to the outputs of detectors 12A and 12B, respectively, for receiving square wave signals 14A and 14B. Gate 16BC includes two inputs B and C connected to the outputs of detectors 12B and 12C, respectively, for receiving the square wave signals 14B and 14C. Finally, gate 16CA includes two inputs B and A connected to detector 12C and detector 12A, respectively, for receiving signals 14C and 14A. During the period when either but not both of the square wave signals 14A and 14B is present at an input to gate 16AB, the latter provides an output signal 18AB. A similar signal 18BC is provided at the output of gate 16BC during the presence of one but not both of the signals 14B and 14C at the input to gate 16BC. Finally, an output signal 18CA is provided at the output of gate 16CA when one but not both of the signals 14C and 14A is present at an input to gate 16CA.

The output signals 18AB, 18BC and 18CA are illustrated in FIG. 4B in phase relationship to the square wave signals 14A, 14B and 14C. It should be clear from these figures, that the signal 18AB is initiated simultaneously with signal 14A and ends upon initiation of signal 14B. Signal 18BC (excluding the shaded area) is initiated simultaneously with signal 14B and terminates upon initiation of signal 14C. Signal 18CA (excluding the shaded area) is initiated simultaneously with signal 14A and terminates upon initiation of signal 14C.

Signals 18 have been described thus far under normal (non-fault) conditions in the three-phase distribution system being monitored. Let it now be assumed that a high impedance fault occurs on one of the lines, for example on the C phase line. As discussed previously, this will cause a phase delay in the third harmonic component in the C phase line, for example the 19° lag discussed above with respect to FIG. 2. Because of this lag, the square wave signal 14C is shifted forward (delayed) in phase by the amount of the lag, e.g. by an amount indicated generally at X in FIG. 4A. This, of course, causes a delay in the initiation of signal 14C by the same amount which, as seen in FIG. 4B, increases the duration of signals 18BC and 18CA by an equal amount as indicated by the added shaded area. In other words, because of the lag in the third harmonic component in the C phase line (or any other component being measured) during a period when the other components, e.g., the third harmonic components in the A and B phase lines remain unchanged, two of the three signals 18 increase in duration while one remains unchanged. The signal which remains unchanged is of course the one at the output of the EXCLUSIVE OR gate having inputs not including the delayed square wave signal 14. In the example illustrated, the unchanged signal would of course be 18AB.

From the foregoing, it should be readily apparent that device 10 can be used for sensing a change in the phase of any one current or component thereof in a three-phase distribution circuit during a period when the phases of the other currents or corresponding components remain unchanged.

In a preferred embodiment, device 10 includes THREE PULSE-WIDTH TO VOLTAGE converters 20AB, 20BC, and 20CA which are indicated by dotted lines in FIG. 3 and which are respectively connected to the outputs of gate 16AB, 16BC and 16CA. Each converter which is designed by readily provided or conventional circuitry functions to convert (integrate) its input, e.g., one of the signals 18 to a analog voltage signal having a corresponding amplitude. FIG. 4C illustrates these signals indicated generally at 22AB, 22BC, and 22CA, respectively. The solid line version of these signals correspond to the non-shaded signals 18 and the dotted line versions correspond to the longer duration signals including the shaded area. In the example illustrated, the signal 22BC and the signal 22CA actually increase in amplitude as a result of the high impedance fault while the signal 22AB remains unchanged in amplitude. These amplitude signals 22 provide readily adaptable outputs to the overall device 10, although the pulse width signals 18 could also serve as the ultimate output of the device.

Having described device 10, attention is now directed to an overall system 23 for detecting a high impedance fault on a solidly grounded, wye connected three-phase distribution circuit using device 10 in this system. Referring specifically to FIG. 5, system 23 is shown in block diagram including within the dotted lines device 10 described above. As seen there, the three zero-cross detectors 12A, 12B and 12C comprising a part of device 10 are connected to the outputs of three 180 Hz band pass filters 24A, 24B and 24C, respectively. These filters which are of conventional or readily provided design are respectively connected into the A phase, B phase and C phase line currents of the distribution circuit for passing to their outputs and, hence, the inputs of the zero-cross detectors only the third harmonic current components. In actual practice, the filters pass a band of components including components slightly less than and greater than the third harmonic components, for example those components which are 180 Hz+3 Hz.

The third harmonic components in the distribution circuit are monitored by device 10 for providing output signals 22AB, 22BC and 22CA at its outputs, this is, at the outputs of PULSE WIDTH TO VOLTAGE converters 20AB, 20BC and 20CA. These latter signals are respectively applied to the inputs of three amplitude comparators 26AB, 26BC and 26CA which also comprise a part of overall system 23. Each of these comparators serves to compare its input signal 22 with a reference signal and it provides an output signal if and only if its input signal 22 is greater. In each case the reference signal provided is one which is equivalent or slightly greater in amplitude to the amplitude of the associated signal 22 under normal operation when no high impedance fault (or other distrubance) is present. Thus, the comparator 26AB provides a digital (logically high) output signal 28AB if signal 22AB is greater in amplitude than its normal amplitude or an amplitude slightly greater than the latter. At the same time, comparator 26BC provides a digital (logically high) output signal 28BC if its input signal 22BC is greater in amplitude than its normal amplitude and comparator 26CA provides a digital (logically high) output signal 28CA if its input signal 22CA is greater in amplitude than its normal amplitude.

The output signals 28AB, 28BC and 28CA, if present, are respectively applied to the inputs of three time discriminators 30AB, 30BC and 30CA which also comprise part of overall system 23. The three time discriminators serve to provide respective output signals 32AB, 32BC and 32CA if their respective input signals 28 are present for a continuous predetermined period, for example for a period exceeding seven seconds. In this way, the overall system is capable of distinguishing a true fault from a short duration transient disturbance or blown fuse which might otherwise be mistaken for a high impedance fault. The three signals 32, if present, are respectively applied to three inputs of a FAULT IDENTIFICATION LOGIC circuit 34 illustrated in FIG. 5. This latter circuit is provided for producing an output or preliminary detection signal 36 if and only if two of the three signals 32 are present simultaneously. Signal 36 is not provided if all three signals 32 are present, if none are present or only one is present.

The output to circuit 34 is connected to the input of a fault detection circuit 38 which serves to produce a trip or fault indicating signal 40, that is, a signal to be used to indicate the actual presence of a high impedance fault on one line of the solidly grounded, wye connected three-phase distribution circuit being monitored during a period when the other two lines do not include a similar high impedance fault. However, signal 40 will be produced only under the conditions that previously recited signal 36 is present at one input and an inhibit signal 42 (to be discussed hereinafter) is not present at a second input.

Inhibit signal 42 is provided by an overall inhibit arragement including a first LINE CURRENT CHANGE detector 44, a second LINE CURRENT CHANGE detector 46 and an inhibit signal producing circuit 48. Detector 44 has three inputs respectively connected into the distribution circuit with its three-phase line currents, as illustrated in FIG. 5. Detector 44 serves to monitor the amplitude of all three currents making up the three-phase distribution circuit and produces an output signal 50 if and only if all three simultaneously change, e.g., increase or decrease in amplitude relative to a preset reference. Detector 46 is connected into the distribution circuit in the same manner as detector 44 and is provided for sensing the rate of current rise in each phase, that is the differential di/dt where i is line current amplitude at any given time t. If the rate of current rise in any one of the three lines is greater than a preset value, detector 46 provides an output signal 52.

Output signals 50 and 52 result from certain disturbances in the distribution circuit being monitored other than high impedance faults. More specifically, the signal 50 results from three-phase load increase, three-phse capacitor switching as well as other possible disturbances. The signal 52 results from line switching transients, single phase switching as well as other possible disturbances. If either of these signals is present it is applied to the input of inhibit signal producing circuitry 48 as illustrated in FIG. 5 which, in turn, produces the previously recited inhibit signal 42. In this way, as will be seen hereinafter, overall system 22 is capable of discriminating a true high impedance fault from the disturbances just recited, as well as other possible disturbances.

Having described the various components making up overall system 23 and their various functions individually, attention is now directed to the way in which the system functions as a whole for detecting high impedance faults in a solidly grounded, wye connected three-phase distribution circuit while, at the same time, discriminating between this type of fault and other possible disturbances in the circuit. In this regard, attention is directed to FIG. 6 which illustrates system 10 operationally starting at the output of PULSE WIDTH TO VOLTAGE CONVERTORS 20AB, 20BC and 20CA, e.g., at the output of phase change detector 10. In FIG. 6, the filters 24 and the phase change detector itself have been eliminated and replaced with the term START in each line AB, BC and CA which actually correspond to the signals 22AB, 22BC and 22CA.

Turning now to the operation of overall system 23, if any of the signals 22 exceeds the threshold amplitude, e.g. the amplitude of the reference signal provided by its associated comparator 26, this signal is retained as signal 28. If the threshold is exceeded for a predetermined periof of time, specifically for a period greater than seven seconds in a preferred embodiment, an associated signal 32 results. In this way, the circuitry ignores transients or other disturbances of a duration less than seven seconds. The system then checks to see if two and only two of these signals 32 are present and, if this is the case, it means that there has been a phase delay in one of the third harmonic components and only one and that this phase delay has exceeded a period of seven seconds, thereby discriminating against the possibility of transient signals causing the same type of delay but for a duration less than seven seconds. Assuming that two and only two signals 32 are present, the preliminary detection signal 36 is produced and provided for initiating trip or fault indicating signal 40 if and only if signal 42 is not present, that is, assuming the line current is not changed in the manner described to produce an inhibit signal.

Returning to FIGS. 3 and 5, it is to be understood that various components making up detector 10 and overall system 23 are in and by themselves readily provided by those with ordinary skill in the art based on the foregoing descriptions. Nevertheless, FIGS. 7-11 and Table I which is a parts list of some of the circuit components schematically illustrated set forth a preferred and actual working embodiment of the present invention. The parts listed are those not apparent from the drawings. It is also to be understood, however, that this actual working embodiment is not intended to limit the present invention.

TABLE I (PARTS LIST)

| FIG. Designation | Part No. | Description | Manufacturer |
| --- | --- | --- | --- |
| A | UAF 31 | Universal Active Filter | Burr-Brown |
| B | LM 311 | Voltage Comparator | National Semiconductor |
| C | LM 324 | Operational Amplifier-Quad | National Semiconductor |
| D | LM 339 | Voltage Comparator-Quad | National Semiconductor |
| E | 4136 | Operational Amplifier-Quad | Raytheon |
| F | HA 2420 | Sample and Hold | Harris Semiconductor |
| G | HA 4900 | Precision Comparator-Quad | Harris Semiconductor |
| H | SN 74 LS123 | Dual One-Shot | Texas Instruments |
| I | 2N2222 | Transistor - NPN | Motorola |
| J | 2N2907 | Transistor - PNP | Motorola |

What is claimed:

1. A device for use in detecting high impedance faults on a solidly grounded, wye connected three-phase distribution circuit, said device comprising means for sensing the third harmonic current component in each three-phase line current of said distribution circuit including the phase of each of said current components relative to the others, and means connected with said current component sensing means for sensing a change in the phase of any one of said components during a period when the phases of the other of said components remain unchanged.

2. A device according to claim 1 wherein said current component sensing means includes band pass filter means adapted for connection with said distribution circuit for providing said third harmonic current component for each of said line currents at an output of said filter means.

3. A device according to claim 2 wherein said current component sensing means includes signal converting means connected with the outputs of said pass band filter means for producing first, second and third square wave current signals respectively corresponding in phase to said third harmonic current components.

4. A device according to claim 3 wherein said phase change sensing means includes a first EXCLUSIVE OR gate having a pair of inputs respectively responsive to said first and second square wave current signals for producing a first output signal corresponding in duration to the difference in phase between said first and second square wave current signals, a second EXCLUSIVE OR gate having a pair of inputs respectively responsive to said second and third square wave current signals for producing a second output signal corresponding in duration to the difference in phase between said second and third square wave current signals and a third EXCLUSIVE OR gate having a pair of inputs respectively responsive to said first and third square wave current signals for producing a third output signal corresponding in duration to the difference in phase between said first and third square wave current signals.

5. A device according to claim 4 wherein said phase change means includes means for converting each of said output signals to an analog voltage signal having an amplitude corresponding to the duration of the output signal converted.

6. For use in a three-phase distribution circuit, a device for detecting a change in the phase of any one of the three-phase line currents in said circuit during a period when the phase of each of the other currents remains unchanged, said device comprising means adapted for connection with said circuit for producing first, second and third square wave current signals respectively corresponding in phase to said line currents, a first EXCLUSIVE OR gate having a pair of inputs respectively responsive to said first and second square wave current signals for producing a first output signal corresponding in duration to the difference in phase between said first and second square wave current signals, a second EXCLUSIVE OR gate having a pair of inputs respectively responsive to said second and third square wave signals for producing a second output signal corresponding in duration to the difference in phase between said second and third square wave current signals and a third EXCLUSIVE OR gate having a pair of inputs respectively responsive to said first and third square wave current signals for producing a third output signal corresponding in duration to the difference to phase between said first and third square wave current signals.

7. A device according to claim 6 including means for converting each of said output signals to an analog voltage signal having an amplitude corresponding to the duration of the output signal converted.

8. A system for detecting high impedance faults in a solidly grounded, wye connected three-phase distribution circuit, said system comprising means adapted for connection with said circuit for sensing the phases of the third harmonic current components in each of the three-phase line currents of said distribution circuits and providing a preliminary detection signal as a result of a change in the phase of any one of said components for a predetermined period of time during which the phase of the other components remain unchanged, means adapted for connection with said circuit for producing an inhibit signal in response to and indicative of predetermined changes in the magnitude of said three-phase line currents and means for producing a fault signal in response to said preliminary signal but only if said inhibit signal is not present at the same time.

9. A system according to claim 8 wherein said predetermined period is greater than seven seconds.

10. A system according to claim 8 wherein said predetermined changes in the magnitude of said line currents include simultaneous increases or decreases in the magnitude of all three of said line currents.

11. A system according to claim 8 wherein said predetermined changes in the magnitude of said line currents include a predetermined minimum increase in the magnitude of any one of said currents over a predetermined period of time.

12. A system for detecting high impedance faults in a solidly grounded, wye connected three-phase distribution circuit, said system comprising: a device adapted for connection with said distribution circuit for sensing the phases of the third harmonic current components in the three-phase line currents of said distribution circuit and providing a prefault phase-change signal as a result of a change in the phase of any one of said components for a predetermined period at which time the phases of the others of said components remain unchanged, said device including band-pass filter means for providing said third harmonic current components, means for producing first, second and third square wave current signals respectively corresponding in phase to said current components, a first EXCLUSIVE OR gate having a pair of inputs respectively responsive to said first and second square wave current signals for producing a first output signal corresponding in duration to the difference in phase between said first and second square wave current signals, a second EXCLUSIVE OR gate having a pair of inputs respectively responsive to said second and third square wave signals for producing a second output signal corresponding in duration to the difference in phase between said second and third square wave current signals and a third EXCLUSIVE OR gate having a pair of inputs respectively responsive to said first and third square wave current signals for producing a third output signal corresponsing in duration to the difference in phase between said first and third square wave signals, means for converting each of said output signals to an analog voltage signal having an amplitude corresponding to the duration of the output signal converted, means for comparing the amplitude of each of said analog voltage signals to a reference signal having an amplitude equal to the expected difference in phase of the current components being sensed, in the absence of a high impedance fault, and producing an amplitude-change signal in response to and indicative of the difference between said analog voltage signal and said reference signal, time discriminating means responsive to said amplitude-change signals for producing potential fault indicating signals only after and as a result of the presence of said amplitude-change signals for said predetermined period, and means for producing said phase-change signal when two and only two of said potential fault indicating signals are present; means adapted for connection with said circuit for producing an inhibit signal in response to and indicative of the simultaneous increase or decrease in the magnitudes of all three of said three-phase line currents or a predetermined minimum increase in the magnitude in any one of said three-phase currents over a predetermined period of time; and means for producing a fault signal in response to said phase-change signal but only if said inhibit signal is not present at the time of said phase change signal.

13. A method of detecting high impedance faults on a solidly grounded, wye connected three-phase distribution circuit, said method comprising the steps of providing the third harmonic current components in each three-phase line current of said distribution circuit, providing the phase of each of said current components relative to the others, and sensing a change in the phase of any one of said components during a period when the phases of the other of said components remain unchanged.

* * * * *